G. H. LEE.
BROODER.
APPLICATION FILED DEC. 10, 1909.
966,222.
Patented Aug. 2, 1910.
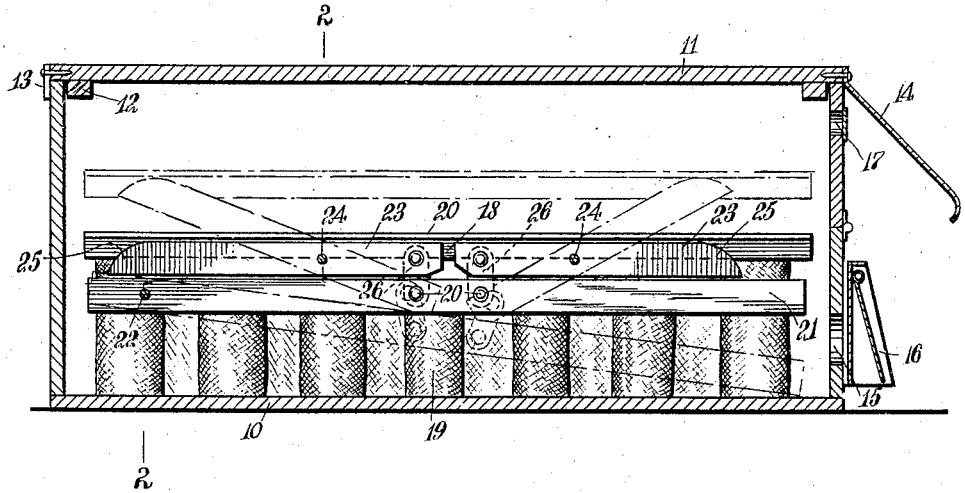
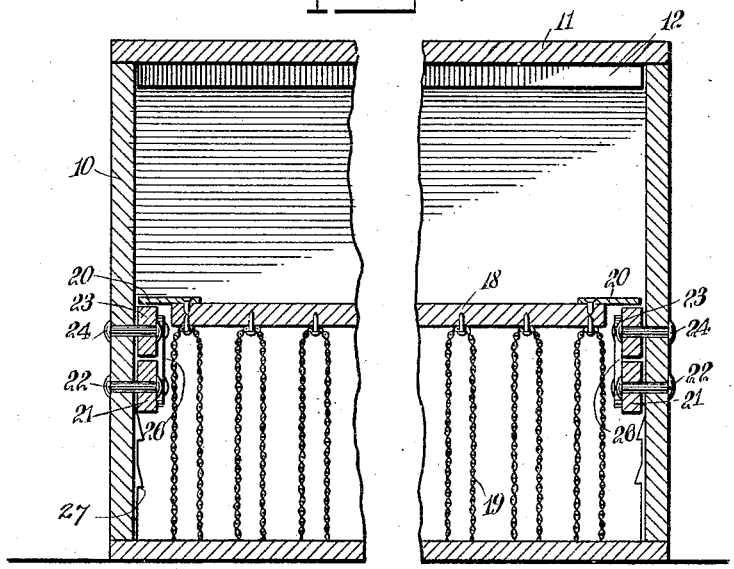
WITNESSES:
J. A. Brophy
John K. Brackvogel
INVENTOR
George H. Lee
BY
Munn & Co
ATTORNEYS

UNITED STATES PATENT OFFICE.

GEORGE HOWARD LEE, OF OMAHA, NEBRASKA.

BROODER.

966,222.

Specification of Letters Patent.

Patented Aug. 2, 1910.

Application filed December 10, 1909. Serial No. 532,348.

*To all whom it may concern:*

Be it known that I, GEORGE H. LEE, a citizen of the United States, and a resident of Omaha, in the county of Douglas and State of Nebraska, have invented a new and Improved Brooder, of which the following is a full, clear, and exact description.

This invention relates to brooders for raising young chickens and the like, and has reference more particularly to a device of this class, comprising a casing, and an adjustable hover adapted to be raised and lowered, so that the chicks or other creatures in the brooder can be protected to a greater or less degree, against temperature changes.

The object of the invention is to provide a simple and efficient brooder, which obviates the necessity of artificial heating means, in which a hover is employed to protect and shelter the chicks or other creatures therein, and in which the hover can be raised and lowered, to adjust it as desired.

The invention consists in the construction and combination of parts to be more fully described hereinafter and particularly set forth in the claims.

Reference is to be had to the accompanying drawings forming a part of this specification, in which similar characters of reference indicate corresponding parts in both views, and in which—

Figure 1 is a longitudinal section of an embodiment of my invention; and Fig. 2 is a transverse section on the line 2—2 of Fig. 1, parts being broken away.

Before proceeding to a more detailed explanation of my invention, it should be clearly understood, that while it is particularly useful in connection with so-called "fireless" brooders, the invention can also be advantageously employed in connection with other like devices in which hovers are used. The hover comprises a frame or board having associated therewith flexible strips or curtains of heat-insulating material such as flannel or other fabric, which can be lowered upon the chicks within the brooder and thus surround and shelter them so that the natural warmth of the creatures is confined within the brooder and cannot be dissipated except to a very slight extent. By thus retaining the animal heat produced by the chicks themselves, artificial heating means can be dispensed with, or need be employed as auxiliaries only. I have found it of advantage to provide an adjustable hover which can be raised or lowered to protect or shelter the chicks to a greater or less degree, depending upon temperature conditions. Certain of the structural details shown for example herewith, form no part of the invention, and can be varied in accordance with individual preference and special conditions, without departing from the underlying spirit of the invention.

Referring more particularly to the drawings, I provide a brooder casing 10, of any suitable form, and fashioned from wood or other material adapted for the purpose. The casing has a removable top 11, having retaining cleats 12, and downwardly disposed flanges 13. At one end the top may be provided with a rain shelter 14. The casing has suitable ventilating openings 15, associated with which are shields or guards 16, to prevent the entrance of moisture, dust and vermin. If so desired, additional ventilating openings 17, may be provided in the casing.

Movably arranged within the casing is a hover frame or board 18 to which are secured the depending strips 19, of heat-insulating material. At opposite, longitudinal edges the member 18 has secured thereto metal or like strips 20, which constitute laterally extended flanges. At each side, within the casing, is arranged a lever 21, pivotally mounted at one end by means of a suitable pin 22, and operable for a purpose to appear hereinafter. Arms or members 23, are arranged in pairs above the levers and are pivotally mounted by means of pins or the like, 24. The members 23 have the outer ends 25 rounded, and are connected at the opposite ends, by means of links 26, with the levers 21, intermediate the ends of the latter.

When the levers 21 are depressed, the inner, adjacent ends of the members 25, which are normally alined, are pulled downward so that the outer ends are swung upward and by engaging the flanges 20, raise the hover as is indicated in dotted outline in Fig. 1. By raising the free ends of the levers 21 the operation is reversed and the hover is lowered. It will be understood that in this way the hover can be adjusted to lift the protective strips 19 from the floor or bottom of the brooder, or to lower them to the same. The arms 23 when alined, serve as supports for the hover, the flanges 20 resting upon the arms as is shown in the drawings.

Any suitable means can be employed for holding the levers in a plurality of positions. As is shown for example, in Fig. 2, I employ flexible strips 27, having offsets or shoulders 28, and secured at the sides of the casing. When the levers are depressed, the strips spring aside, to permit the engagement of the levers with the shoulders, so that the levers can be held in different positions. The strips can be forced inwardly to release the levers.

Having thus described my invention, I claim as new, and desire to secure by Letters Patent:—

1. In a device of the class described, a casing, a hover within said casing, and lever-mechanism for raising and lowering said hover, so that it maintains a constant angularity with the horizontal.

2. In a device of the class described, a casing, an adjustable hover therein, lever mechanism, and means operated by said lever-mechanism to raise and lower said hover.

3. In a device of the class described, a casing, a hover therein, arranged to be raised and lowered, pivoted levers, and arms connected with said levers and adapted to engage said hover to raise the same when said levers are operated in a predetermined manner.

4. In a device of the class described, a casing, a hover in said casing and adapted to be raised and lowered, pivoted levers, pivoted arms, and links connecting said arms and said levers, said arms being adapted to engage said hover to raise the same when said levers are moved in a predetermined direction.

5. In a device of the class described, a casing, a hover frame therein having laterally extending flanges, levers pivoted at the sides of said casing, arms pivoted at the sides of said casing, and links connecting said arms and said levers, said arms having rounded ends adapted to engage said flanges, to raise said hover frame when said levers are lowered.

6. In a device of the class described, a casing, a hover arranged in said casing and adapted to be raised and lowered, pivoted arms within said casing and forming a support for said hover, and levers controlling said arms whereby said arms can be operated to raise said hover.

7. In a device of the class described, a casing, a hover within said casing, arms pivotally mounted within said casing and adapted to have said hover rest thereon, whereby said arms form a support for said hover, and pivoted levers operatively connected with said arms and operable to cause said arms to raise said hover.

In testimony whereof I have signed my name to this specification in the presence of two subscribing witnesses.

GEORGE HOWARD LEE.

Witnesses:
STELLA CHASE,
HARRY ROWLEY.